United States Patent
Hughes (10) Patent No.: US 8,241,125 B2
(45) Date of Patent: Aug. 14, 2012

(54) APPARATUS AND METHOD OF INTERACTION WITH A DATA PROCESSOR

(75) Inventor: Colin Jonathan Hughes, London (GB)

(73) Assignee: Sony Computer Entertainment Europe Limited (GB)

( * ) Notice: Subject to any disclaimer, the term of this patent is extended or adjusted under 35 U.S.C. 154(b) by 679 days.

(21) Appl. No.: 12/374,721

(22) PCT Filed: Jul. 17, 2007

(86) PCT No.: PCT/GB2007/002685
§ 371 (c)(1),
(2), (4) Date: Apr. 14, 2009

(87) PCT Pub. No.: WO2008/012502
PCT Pub. Date: Jan. 31, 2008

(65) Prior Publication Data
US 2009/0318228 A1    Dec. 24, 2009

(30) Foreign Application Priority Data
Jul. 25, 2006    (GB) .................................. 0614783.9

(51) Int. Cl.
*A63F 9/24*    (2006.01)
(52) U.S. Cl. ........................................................ 463/36
(58) Field of Classification Search .................... 436/36; 463/36
See application file for complete search history.

(56) References Cited

U.S. PATENT DOCUMENTS

| | | | |
|---|---|---|---|
| 5,704,836 A | 1/1998 | Norton et al. | |
| 6,754,400 B2 * | 6/2004 | Florin et al. | 382/285 |
| 7,598,975 B2 * | 10/2009 | Cutler | 348/14.08 |
| 7,782,357 B2 * | 8/2010 | Cutler | 348/36 |
| 2002/0063802 A1 | 5/2002 | Gullichsen et al. | |
| 2004/0061933 A1 * | 4/2004 | Hack | 359/443 |

(Continued)

FOREIGN PATENT DOCUMENTS

EP    1441307    7/2004

(Continued)

OTHER PUBLICATIONS

International Search Report and Written Opinion dated Oct. 24, 2007 from the corresponding PCT/GB2007/002685.

(Continued)

*Primary Examiner* — N Drew Richards
*Assistant Examiner* — Robert Carpenter
(74) *Attorney, Agent, or Firm* — Lerner, David, Littenberg, Krumholz & Mentlik, LLP (57) ABSTRACT

A method of interaction with a data processor such as a games machine comprises the steps of capturing a wide angle image of an environment, obtaining image features from the wide angle image, and then interpreting these image features as inputs to software running on the games machine. The step of obtaining image features from the wide angle image further comprises the step of mapping one or more regions of the wide-angle image to corresponding one or more flat image planes, and obtaining image features from one or more of said planes of the mapped wide-angle image. Advantageously, the planes can be arranged to reflect the topology of a room or the positioning of players, and allow a consistent representation of image features and consequently of input motion to a process such as a game, without position dependent distortions of the features inherent in the wide angle image.

31 Claims, 6 Drawing Sheets

U.S. PATENT DOCUMENTS

2004/0105597 A1 * 6/2004 Lelescu et al. ................ 382/276
2005/0208999 A1 9/2005 Cheng et al.

FOREIGN PATENT DOCUMENTS

WO 2005094958 10/2005

OTHER PUBLICATIONS

UK Search Report dated Nov. 8, 2006 from GB0614783.9.
Greene N: "Environment Mapping and Other Applications of World Projections" IEEE Computer Graphics and Applications, IEEE Service Center, New York, NY, US, vol. 6, No. 11, Nov. 1, 1986, pp. 21-29, XP000002234 ISSN: 0272-1716.
Ken Turkowski: "Making Environment Maps from Fisheye Photographs" [Online] Jun. 4, 1999, XP002454019 Retrieved from the Internet: URL:http://www.worldserver.com/turk/quicktimevr/fisheye.html> [retrieved on Oct. 4, 2007].
Office Action from European Application No. 07766256 dated Jun. 11, 2010.

* cited by examiner

APPARATUS AND METHOD OF INTERACTION WITH A DATA PROCESSOR

The present invention relates to an apparatus and method of interaction with a data processor such as a games machine, and in particular to an apparatus and method of interaction based upon image analysis.

Many entertainment devices, such as video games machines, have a variety of peripheral control means. These include joysticks, keypads and joypads, as well as game-specific controllers such as steering wheels, lightguns and golf clubs.

However, the physical operation of such controllers inherently limits the type of interaction that they can provide. Typically, it is limited to either button-pushing or specific, bespoke actions such as a golf-swing.

Recent video games machines such as the Sony™ Playstation 2™ video games machine and Playstation 3™ video games machine have also featured optical peripheral controllers such as the Eye Toy™, which provides a new means of interaction with games by enabling control of a game by the user's body motion. Such a controller is typically arranged to sit on top of a television set (TV) upon which the game is displayed, where the controller can observe the player. The player's image is then incorporated within the game environment, allowing them to interact with the game by moving with respect to that environment.

The present invention provides a further means of interaction with an entertainment device such as a games machine.

In a first aspect of the present invention, a method of interaction with a games machine, comprising the steps of:
capturing a wide angle image of an environment;
obtaining image features from the wide angle image, and
interpreting those image features as inputs to software running on the games machine,
wherein the step of obtaining image features from the wide angle image further comprises the steps of:
mapping one or more regions of the wide-angle image to corresponding one or more flat image planes, hereafter referred to as facets, and
obtaining image features from one or more of said facets of the mapped wide angle image.

Advantageously, the planes can be arranged to reflect the topology of a room or the positioning of players, allowing a consistent analysis of image motion and consequently of input motion to a process such as a game.

In a second aspect of the present invention, a controller device comprises an imaging means coupled with a wide-angle lens means and operable to capture a wide-angle image, wherein the wide-angle lens means provides a substantially hemispherical field of view, and wherein image features obtained from the wide angle image are interpretable as inputs to software running on said games machine.

This combination of features provides the wide-angle image of the environment used by the method of interaction.

Embodiments of the present invention will now be described by way of example with reference to the accompanying drawings, in which.

A method of interaction with a games machine and a corresponding controller apparatus are disclosed. In the following description, a number of specific details are presented in order to provide a thorough understanding of embodiments of the present invention. It will be apparent, however, to a person skilled in the art that these specific details need not be employed to practice the present invention. Conversely, specific details known to the person skilled in the art are omitted for the purposes of clarity in presenting the embodiments.

Figure 1:
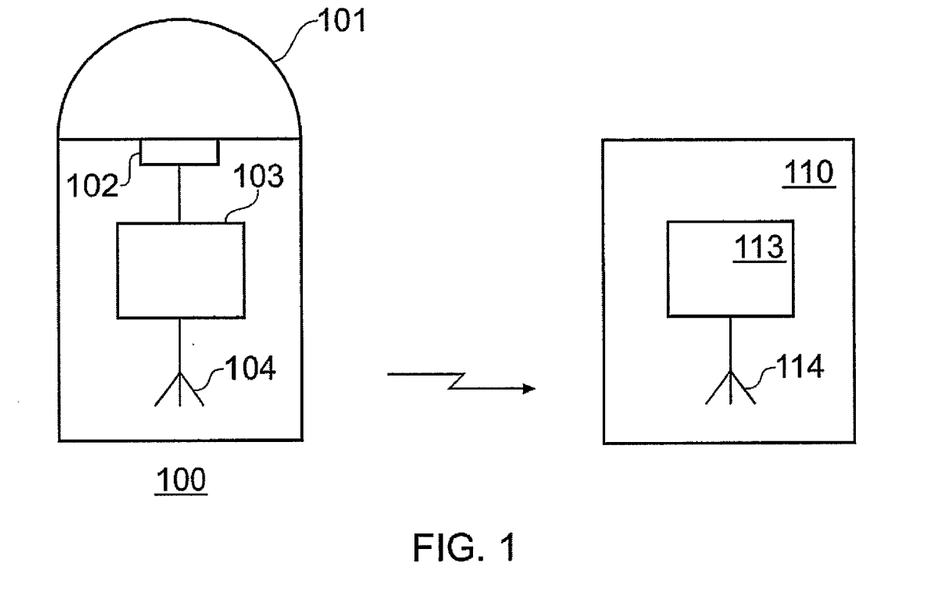
FIG. 1 is a block diagram of a controller and data processor in accordance with an embodiment of the present invention.

Referring to FIG. 1, in an embodiment of the present invention a peripheral control means 100 is provided for a host data processor 110, such as a games machine.

The peripheral control means 100 (hereafter 'controller') comprises a wide-angle lens 101, an imaging means 102 such as a charge coupled device (CCD), an image processor 103 operably coupled to the imaging means 102, and a transmission means 104 such as a wi-fi or Bluetooth™ transmitter operably coupled to the image processor 103, for transmitting data to the data processor 110.

The wide angle lens 101 preferably provides an approximately hemispherical field of view axially centred upon the imaging means 102. The wide-angle lens may be any suitable lens or multiple lens arrangement, such as for example a fish-eye lens, a faceted lens such as a truncated pyramid, or a suitably shaped concentric fresnel lens or lenticular lens.

In an embodiment of the present invention, a method of interaction with a data processor such as a games machine comprises a first step in which a wide-angle image is obtained from the CCD. To this end, the CCD is arranged in conjunction with the wide-angle lens to cause a wide-angle image to be incident on the CCD for capture.

This image is then processed.

In one embodiment of the present invention, the wide-angle image captured by the imaging means 102 is first transmitted to the data processor 110 without further processing (or optionally after compression by known compression means, not shown), and subsequent image processing is conducted by an image processor 113 of data processor 110, following receipt of the data by a receiving means 114. In such an embodiment, the image processor 103 may not be necessary in the controller.

In another embodiment of the present invention, the wide-angle image captured by the imaging means 102 is processed in the controller 100 by image processor 103, and the output of this processing is transmitted to data processor 110.

In a further embodiment of the present invention, the image processing task is passed between the image processors (103, 113) of the controller 100 and data processor 110 such that a first part of the processing is performed by the image processor 103 of the controller 100 whilst a second part is performed by the image processor 113 of the data processor 110.

Consequently, in the following description it will be understood that references to the image processor may refer to either image processor (103, 113), and references to the method of operation of such a processor may apply wholly or partially to the operation of either or both image processors as applicable.

Figure 2:
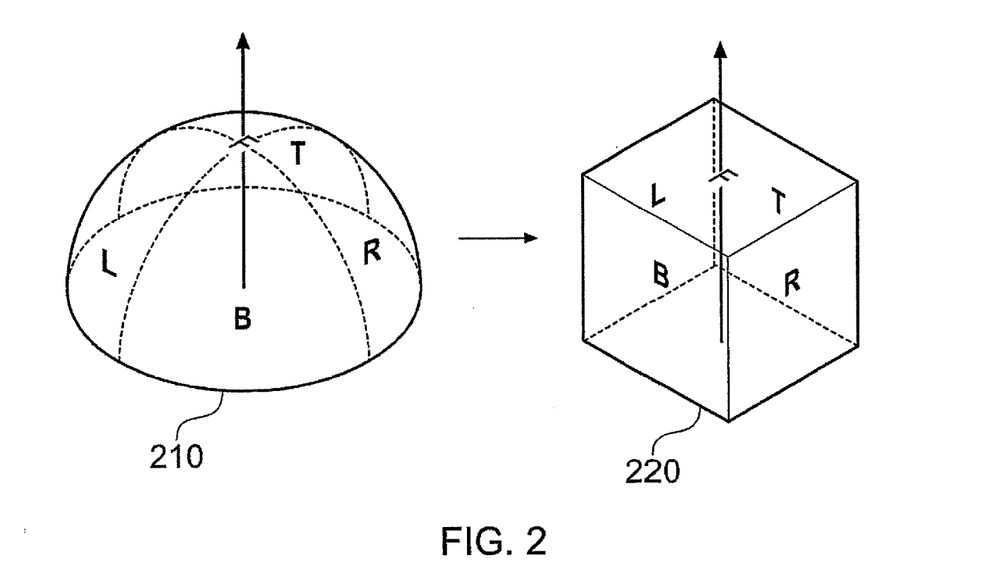
FIG. 2 is a block diagram comparing a wide-angle image view and a mapping of that view to five sides of an image cube, in accordance with an embodiment of the present invention.
Figure 3:
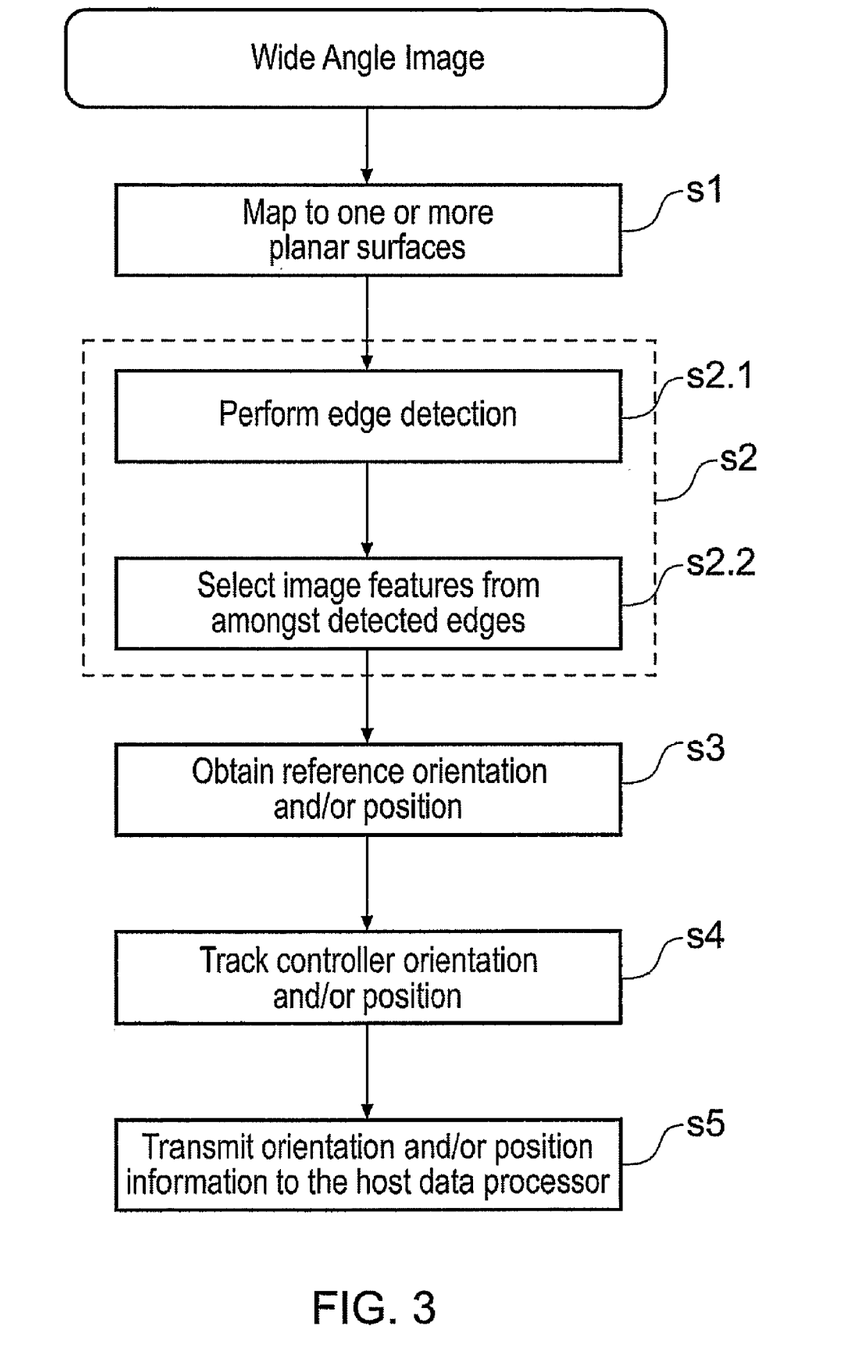
FIG. 3 is a flow chart of a method of image processing in accordance with an embodiment of the present invention.

Referring now to FIGS. 2 and 3, in an embodiment of the present invention the image processor (103, 113) is arranged in operation to process a wide-angle image as shown in FIG. 2, according to the method steps listed in FIG. 3, as follows.

Regions of a wide-angle image 210 are notionally labelled for the situation where the controller 100 is held in the hand like a torch, as; (F)ront or centre-axis view, (T)op ceiling view, (B)ottom floor view, (L)eft view and (R)ight view.

In a step s1 of FIG. 3, these regions are then mapped onto planar surfaces to reduce the image distortion caused by the wide-angle lens. Image transforms for altering the effective projection of a digital image are known, such as environment mapping. In conventional environment mapping, an array of points on a flat texture is mapped to corresponding points on an arbitrary shape, enabling the texture to be 'wrapped' around that shape. In step s1, the reverse process is applied, with a set of points in the distorted image being transformed to a flat plane (see for example http://www.worldserver.com/turk/quicktimevr/fisheye.html, and Ned Greene, *Environment Mapping and Other Applications of World Projections*, IEEE Computer Graphics and Applications, November 1986, vol. 6, no. 11, pp. 21-29). In FIG. 2, five planes were used for five regions of the distorted image.

It will be appreciated that transforms for mapping images from any of the lens arrangements noted previously may be generated by a person skilled in the art.

Preferably, by default the five regions noted above are mapped on to five corresponding planar surfaces that together form five faces or facets of an image cube 220.

It will be appreciated that it is not necessary for the regions thus mapped to exactly meet at each vertex of the cube, and either overlap or gaps are possible.

It will similarly be appreciated that not all regions may necessarily be processed, for example if the ceiling view is essentially featureless. Likewise, if only the front region is relevant to an application, then all the other regions may be ignored.

It will also be appreciated that it is not a necessary condition for the facets to correspond with the front, top, bottom, left or right surfaces of a room, as will be discussed further herein.

Figure 4:
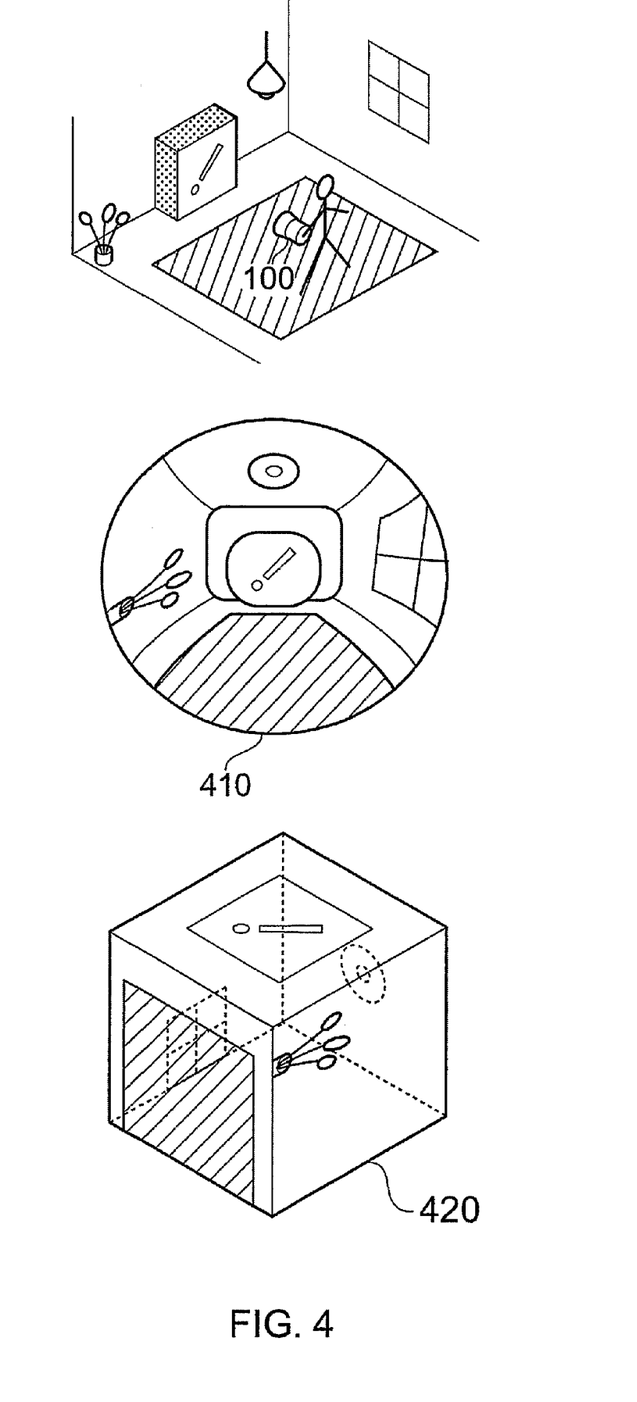
FIG. 4 is a set of three block diagrams illustrating the mapping of an environment onto an image cube, in accordance with an embodiment of the present invention.

Referring now also to FIG. 4, the effect of the mapping process is shown for a gaming scenario.

In FIG. 4, the controller 100 is held like a torch in the band of a user who typically faces a TV screen that is displaying a game (signified by the exclamation mark). The resulting wide-angle image 410 captures substantially all of the features of the room forward of the user. Mapping the regions F, B, T, L and R to corresponding planar surfaces removes the distortion in the image and places each feature of the room within facets of an image cube 420, typically corresponding approximately with the appropriate part of the room, such as walls, ceiling and floor.

It will be appreciated that other regions and geometries are possible, such as four regions mapping to a triangular prism. However, a cube is preferable as it more readily corresponds with the typical geometry of a room.

In a step s2, one or more facets of the image cube 420 are then analysed to extract image features.

In an embodiment of the present invention, in a sub-step s2.1 an image region, as mapped to a facet, is subject to an edge detection process based upon changes to luminance and/or chrominance within the image region. A number of edge detection algorithms are known in the art, such as for example the Sobel operator, the Canny operator, the pyramid operator, and the Laplace operator.

An operator that enhances significant edges in preference to short or fragmentary edges is preferable, such as for example the pyramid operator. This operator works by decimating the image prior to edge detection (using any other suitable edge detection means, such as Canny or Sobel), thus only detecting comparatively large edge features. Having identified these features, edge detection is then applied within the original scale image only in those regions corresponding to the detected large edge features, in order to obtain a more accurate edge estimate at the original scale.

Optionally, the degree of decimation may be adaptive to enable the detection of at least a minimum number of edges, if there are only a few large edge features apparent in the image.

For those edges so obtained, in a sub-step s2.2 any or all of the following are selected as image features;
  i. substantially linear edges;
  ii. points where two or more linear edges meet, and;
  iii. predetermined shapes formed by sets of edges.

Substantially linear edges are defined as comprising at least three substantially co-linear edge points (i.e. points identified by an edge detection algorithm as corresponding with an edge). Any three such points can be evaluated using a straight line fitting algorithm; where the fit is within a predetermined error tolerance, then the points are deemed co-linear. Neighbouring points can then be evaluated either in conjunction with two or more of the established co-linear points, or with respect to the predicted straight line, allowing the linear edge to grow to completion.

Optionally, a minimum length threshold with respect to the image dimensions may also be imposed for the selection of a linear edge. Also optionally, the number of edge points contributing to a linear edge may be taken as indicative of the weighting or significance to attach to it as a comparative feature when assessing motion (see below).

Predetermined shapes formed by a combination of edges may be identified by any suitable image matching means, such as scale independent template matching, or using generalised line fitting means such as Hough's transform or Bresenham's transform.

Alternatively lines, line intersections, and/or shapes may be recognised by trainable heuristics or algorithms such as artificial neural networks incorporated within the image processor at manufacture, or configured in use by the application presently running on the games machine.

Figure 5:
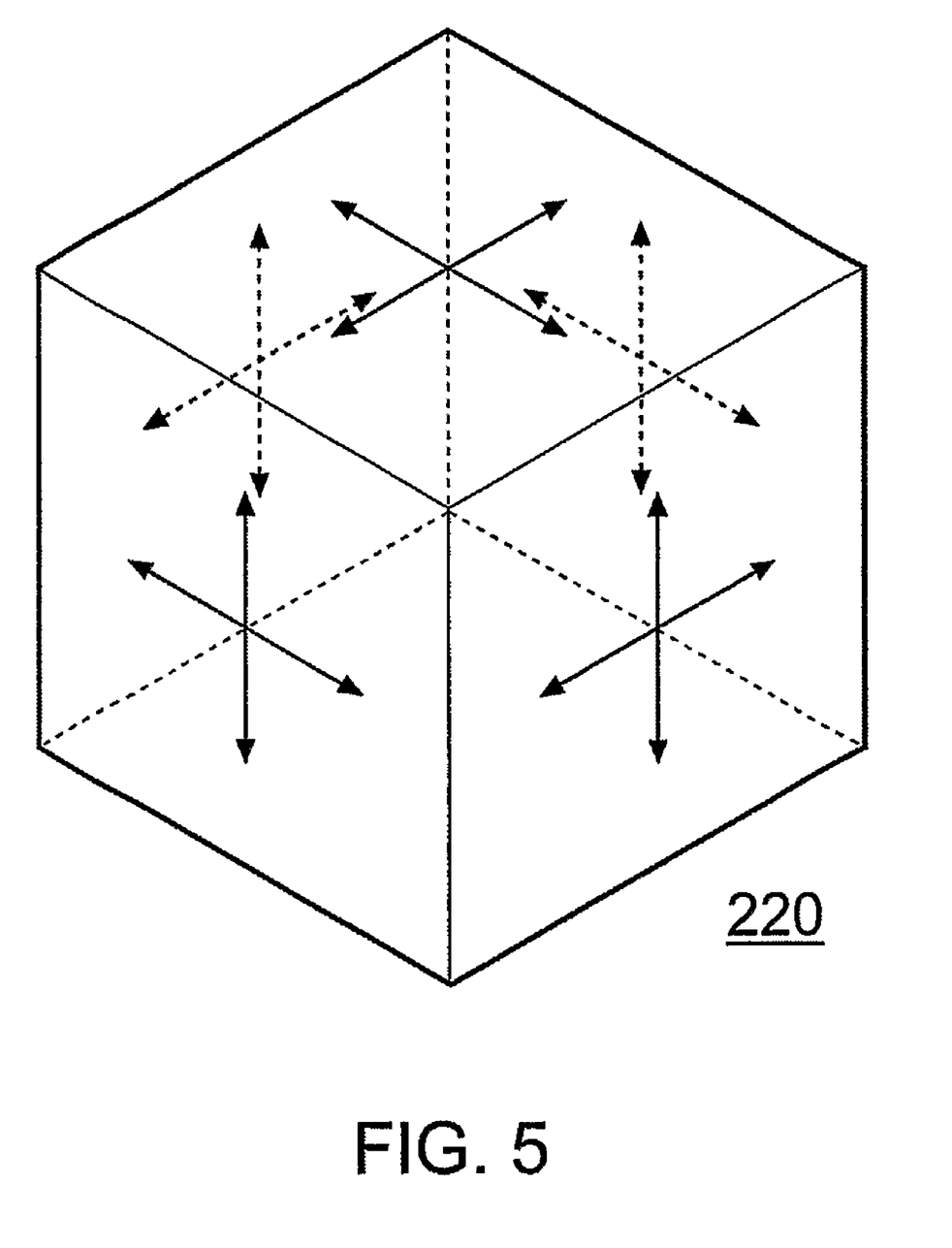
FIG. 5 is a block diagram illustrating axes of image motion upon facets of an image cube, in accordance with an embodiment of the present invention.

Referring now also to FIG. 5, in an embodiment of the present invention, in a step s3 the resulting features for each of the analysed facets are used to provide a reference for the position and orientation of the controller 100.

As illustrated in FIG. 5, each analysed facet provides the means to locate some features of the environment (e.g. a room) in two dimensions.

Thus in operation, for example in the case where five facets of the image cube 420 are available, an initial analysis of the features of each facet is used to determine an initial positioning of the image features in the environment of the room, and to establish an initial position and/or orientation with reference to these features. Such an initial process may for example be conducted during a calibration or set-up phase of a game.

In subsequent use, in a step s4 the current position and/or orientation of the controller 100 may be re-estimated with respect to these features in order to track the motion of the controller 100.

In an embodiment of the present invention, this is achieved by the use of an image transform operable to rotate an image and/or translate an image, as applicable, in order to determine orientation and position respectively for a given facet.

For successive mapped images on a given facet, the preceding image is transformed by the image transform to create a predicted image, which is then compared with the current image. The error between the predicted and current image is then minimised (which in practical terms may of course include "reduced") by adjusting parameters controlling the rotation and/or translation model of the image transform, according to some error minimisation scheme such as a gradient descent scheme.

Once the error minimisation process has terminated, the rotation and/or translation parameter values are indicative of the motion of the controller 100 with respect to the features on the facet during the interval between the successive images.

This motion can then be combined over a plurality of facets and also over a plurality of successive image frames to interpret how the controller 100 is being used.

For example, the controller 100 may be used as a virtual torch in a game, where the controller's orientation is used to inform the direction of a torch being used by an on-screen character. In a similar fashion, the controller 100 may be used as a gun.

More generally, the controller 100 may be used as an indicator such as a computer mouse, with movements in different directions or orientations being interpreted as commands such as panning over a landscape, scrolling through some text, or adjusting a game parameter.

Similarly, the controller 100 may be used to give gestural commands, with patterns of motion being recognised as specific actions, for example enabling it to be used as a virtual wand to cast magic spells in a game, or to draw the user's name or initials in the air for incorporation into a game.

Motion of the controller 100, and optionally the computed velocity or acceleration of the controller 100, may also be used to allow it to act as a virtual golf club or fishing rod, or a melee weapon such as a sword or axe.

Finally, the controller 100 allows for new games specific to this mode of interaction with the games machine, such as for example a virtual follow-the-wire-without-touching game that utilises the locus of the controller 100 in 3D space to trace the user's movement along a narrow path.

It will be appreciated that for some of the above uses, movements of the controller 100 could be sufficient to rotate it through 90° and thus map features of the environment to different facets of the image cube 420. However, this is unlikely to be problematic if the image acquisition rate is fast compared to the rate of rotation, enabling an evolution of features in the image region on a facet that can still be tracked on an image-by-image basis to provide motion information as described previously.

Alternatively, if more than a threshold proportion of reference feature elements has reached the edge of a current facet, the mapping itself may be rotated through 90° in the direction of translation of the features.

Moreover, this may only occur if such translation is found on all those facets consistent with the direction of translation, so indicating motion of the controller 100 within the environment, and not simply motion of one environmental feature with respect to the controller 100.

Thus advantageously, and in general, the redundancy of multiple facets makes the controller 100 more robust to the presence of other people moving in the room.

It will consequently be appreciated by a person skilled in the art that during a configuration session of a game, or when the controller is not experiencing significant movement, the notional orientation of the B, T, L and R facets can be rotated about the axis of the lens to centre features of the environment, such as a room, in each image region. Thus, for example, if a user picks the controller up with an arbitrary rotational orientation about the axis of the lens, such that a strong luminance feature such as a window is bisected by two facets, then the facets can be rotated to centre the window in one facet, thereby establishing likely correlation between the image facets and the walls of the room, and simplifying subsequent motion tracking.

In a variant embodiment of the present invention, a decorative element representing the in-game use (such as a wand, sword or golf club) may be affixed to a fixing means (not shown) at the end of the controller 100 opposite the wide angle lens 101. In this embodiment, it will be clear that identified edge features may include or be occasionally obscured by the user, if they hold the controller such that the decorative element is facing away from them. However, as noted previously, the arrangement of the facets as an image cube 220 means that there is redundancy in the number of features available, making the determination of position and/or orientation more robust to occasionally obscured edges.

In a further variant embodiment, the fixing means comprises switch means to determine modes of use (for example, ignoring one facet, or not transmitting raw video data) appropriate to the game, and the decorative element is shaped to engage said switching means so as to configure the device accordingly.

Alternatively or in addition, in an embodiment of the present invention, transmission means 104 also comprises a receiver means, operable to receive configuration data from the host data processor to determine modes of use, such as whether to transmit supplementary video data, or only process certain facets.

Figure 6:
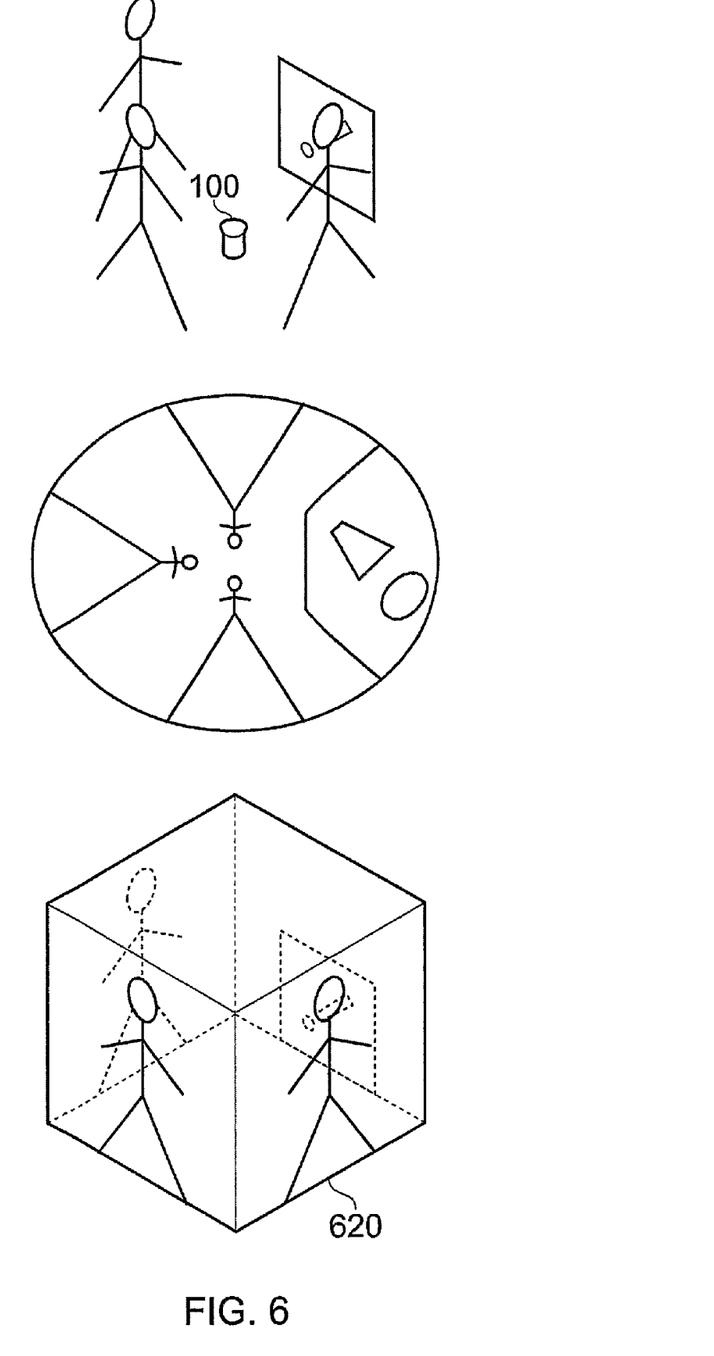
FIG. 6 is a set of three block diagrams illustrating the mapping of an environment onto an image cube, in accordance with an embodiment of the present invention.

Referring now to FIG. 6, in an embodiment of the present invention the controller 100 may be used in a second mode where, rather than being hand-held, it is placed on a surface such as the floor in front of a player, or centrally between two or more players. In this mode of operation, the resulting wide-angle image shows the players in a distorted fashion distributed around the central point of the image. Mapping the regions F, B, T, L and R to corresponding planar surfaces removes the distortion and places each player in a separate facet of an image cube 620.

It will be appreciated that if the players are not uniformly distributed around the controller, image feature detection such as that described previously may be used to determine a region encompassing each player for mapping to a corresponding facet.

Similarly it will be appreciated that for more than four players, optionally the cube may be replaced by a polygonal prism with as many sides as players. For less than four players, unoccupied regions can be ignored, or in the case of three players, optionally a triangular prism may be used.

In this mode of operation, the image features obtained using the method described previously will comprise all or part of each player's outline. Tracking of these features reveals movements of the players. These movements in turn can be interpreted as actions relevant to a game, such as dance moves or sparring moves.

Figure 7:
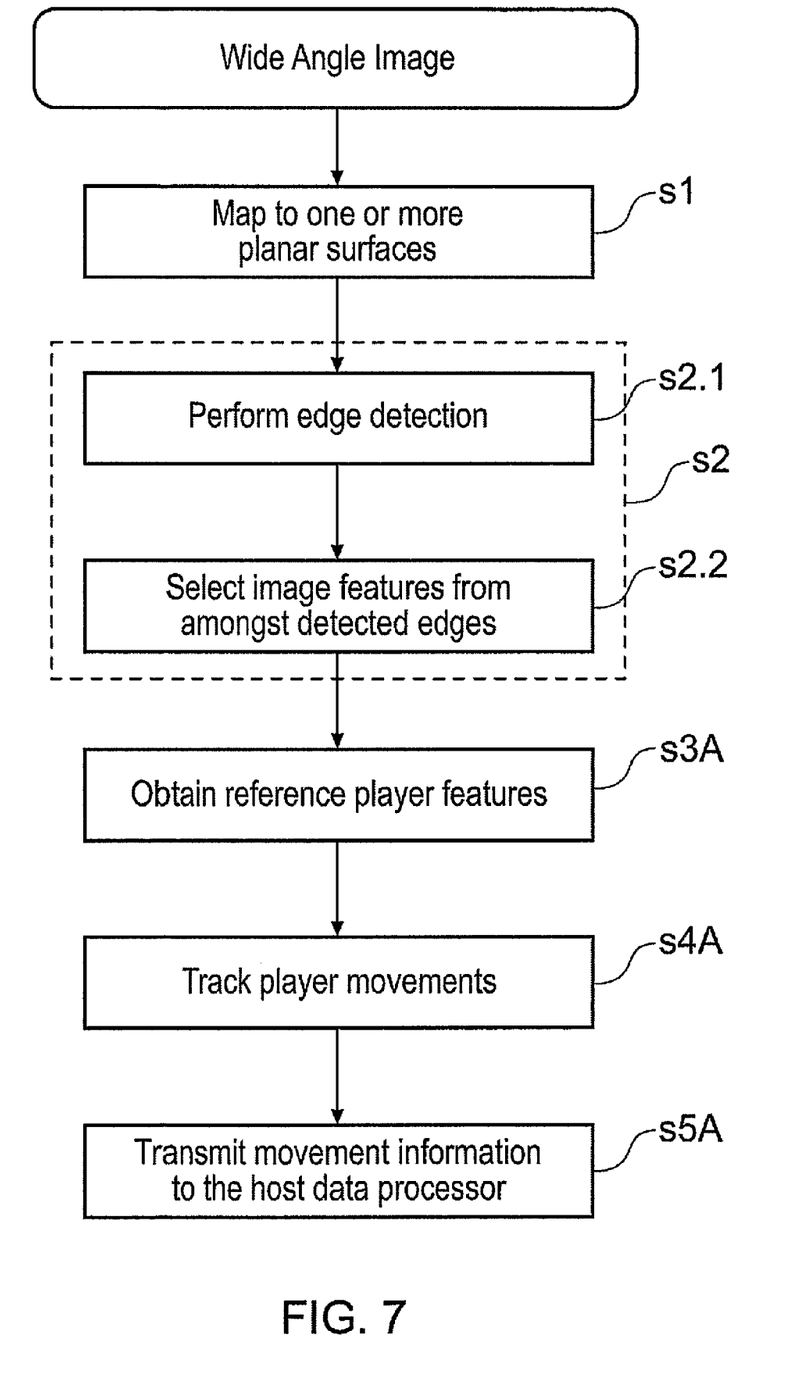
FIG. 7 is a flow chart of a method of image processing in accordance with an embodiment of the present invention.

Thus, with reference to FIG. 7, the method of operation in this embodiment can be summarised as follows. Steps for mapping the image and obtaining image features are substantially as previously described with reference to the controller in hand-held mode.

Next, at a step s3A, image features relevant to the player or players are identified. For example, during a configuration session or as part of a warm-up phase of a game, each player may be asked to move each limb in turn, enabling identification of the significant edges corresponding with that limb. Alternatively or in addition, those edges most consistent with a skeletal model are selected as reference image features. In this way, all or part of the body of a player may be identified for the purposes of the game.

At a step s4A, movements of the player or players are tracked. This may be done as for step s4 in hand-held mode to determine overall movement with respect to the controller, and/or through parametric descriptions of each player's image features, such as centre-line estimates of one or more limbs, based on their edges. Other methods of characterising line motion will be apparent to a person skilled in the art.

At a step s5A, player movement information is transmitted to the host data processor, in this case a games machine.

Optionally, image data depicting the players may also be transmitted, allowing their incorporation within the game. Mapping the players to separate facets facilitates their display side-by-side or in any on-screen arrangement, despite their physical distribution in the room.

It will be appreciated that to provide image data of adequate resolution for each player, the imaging means 102 is preferably a high resolution CCD. For example, the resolution is preferably at least five times that of the resolution of 640×480 pixels found in CCDs of current Eye-Toy™ devices, resulting in a preferred CCD resolution of at least 1.5 megapixels. Consequently, in an embodiment of the present invention, a compatibility mode is also available in which only one facet is processed, to provide data backwardly compatible with output from an EyeToy™ device.

For either the hand-held or centrally-placed modes of operation, it will be appreciated that where the processing method is shared between image processors of the controller and the host data processor, the data transmitted by the controller will be that sufficient to act as input to the next step in the method being carried out on the host data processor. As such it may be interim data other than raw image data or processed motion data.

Consequently, it will be appreciated that in embodiments of the present invention, image processing and the means it requires may be located either within the controller 100, or within the host data processor 110, or distributed between the two, in any suitable manner. Likewise whilst both the controller 100 and the host data processor 110 may comprise full image processors (103, 113), the method of image processing described herein may be wholly carried out by one or other of the processors, or split between both. For example, the controller image processor 103 may map the wide-angle image to five facets, which are then sent to the image processor 113 of the host data processor for further processing.

Thus, the present invention may be implemented in any suitable manner to provide suitable apparatus or operation between the controller and the host processor. In particular, it may consist of a single discrete entity in the form of a controller, or it may be coupled with one or more additional entities added to a conventional host data processor, or may be formed by adapting in addition existing parts of a conventional host data processor, such as by software reconfiguration, e.g. of image processor 113.

Thus adapting existing parts of a conventional host data processor may comprise for example reprogramming of one or more processors therein. As such the required adaptation may be implemented in the form of a computer program product comprising processor-implementable instructions stored on a data carrier such as a floppy disk, optical disk, hard disk, PROM, RAM, flash memory or any combination of these or other storage media, or transmitted via data signals on a network such as an Ethernet, a wireless network, the internet, or any combination of these or other networks.

Finally, it will be appreciated that embodiments of the present invention may provide some or all of the following advantages:

i. A method of interaction with a data processor such as a games machine in which by mapping one or more regions of a wide-angle image to corresponding one or more flat image planes, the planes can be arranged to reflect the topology of a room or the positioning of players.

ii. A method of interaction in which the flat image planes allow a consistent analysis of image features and consequently of motion input to a process such as a game, by reducing the position-dependent distortion inherent in wide-angle images.

iii. A hand-held controller that can detect free movement within an environment by analysing images of that environment;

iv. A controller robust to occlusions and local motion in that environment due to redundancy in the environmental features used, and;

v. A controller producing a wide-angle image that can be mapped to provide separate views of an environment for reproduction in-game, typically of a plurality of players, allowing undistorted representations of multiple players within the game.

The invention claimed is:

1. A method of interaction with a games machine, comprising the steps of:
    capturing, with a camera, a wide angle image of an environment, in which the wide-angle image is substantially hemispherical;
    obtaining image features from the wide angle image, and
    interpreting those image features as inputs to software running on the games machine,
    wherein the step of obtaining said image features from the wide angle image further comprises the steps of:
    mapping, with a processing device, one or more regions of the wide-angle image to corresponding one or more flat image planes, hereafter referred to as facets;
    obtaining said image features from a plurality of the facets of the mapped wide angle image; and
    estimating, from said image features obtained from the plurality of the facets, the positioning of at least part of the body of at least a first user;
    in which the wide angle image is mapped to facets such that each of a plurality of users in the wide angle image is mapped to a separate respective facet.

2. A method according to claim 1, in which there are five facets that together form five planar surfaces of a cube.

3. A method according to claim 1, further comprising a step in which the image features are obtained by performing edge detection on the plurality of the facets.

4. A method according to claim 3, in which edge detection is based upon changes in any or all of:
    i. luminance, and
    ii. chrominance.

5. A method according to claim 3, in which edge detection employs any or all of:
    i. the Sobel operator;
    ii. the Canny operator;
    iii. the pyramid operator; and
    iv. the Laplace operator.

6. A method according to claim 3, further comprising a step of selecting any or all of the following edge types as image features:
   i. substantially linear edges;
   ii. points where two or more linear edges meet; and
   iii. predetermined shapes formed by sets of edges.

7. A method according to claim 6, in which substantially linear edges are determined by identifying three or more substantially co-linear edge points.

8. A method according to claim 6, in which predetermined shapes are identified by any one of:
   i. template matching;
   ii. Hough's transform; and
   iii. Bresenham's transform.

9. A method according to claim 1, comprising a step of estimating, from image features obtained from the plurality of the facets, any or all of:
   i. an initial orientation; and
   ii. an initial position, with respect to said features.

10. A method according to claim 9, comprising a further step of re-estimating, from image features obtained from the plurality of the facets, any or all of:
    i. a current orientation; and
    ii. a current position.

11. A method according to claim 10, in which relative movement of selected image features is tracked over successive images to determine changes in any or all of:
    i. orientation relative to a preceding orientation, and;
    ii. position relative to a preceding position.

12. A method according to claim 11, in which the relative movement of selected image features is determined by generating an image transform embodying any or all of:
    i. orientation parameters; and
    ii. translation parameters, and parametrically minimising the error between the current image features and a prediction of the current image features based upon previously obtained image features processed by said image transform.

13. A method according to claim 11, in which successive estimates of movement are combined as inputs to a game.

14. A method according to claim 13, in which an input may represent the movement of any one of:
    i. a torch or gun;
    ii. a computer mouse;
    iii. a wand or gestural device;
    iv. a golf club;
    v. a fishing rod;
    vi. a melee weapon; and
    vii. a locus in 3D space.

15. A method according to claim 1, further comprising a step of tracking movements of at least a first user by comparing image features from the plurality of the facets of successive images.

16. A method according to claim 1 in which one or more of a plurality of users whose image is mapped to a separate respective facet are displayed within a game.

17. A method according to claim 1, in which a processing sequence comprises:
    i. mapping a wide-angle image to the plurality of the facets;
    ii. obtaining image features from the plurality of the facets; and
    iii. estimating current orientation and/or position with respect to said image features, is carried out by an image processing means of a host data processor upon receipt of a wide-angle image transmitted from a peripheral control means.

18. A method according to claim 1, in which a processing sequence comprises:
    i. mapping a wide-angle image to the plurality of the facets;
    ii. obtaining image features from the plurality of the facets, and;
    iii. estimating current orientation and/or position with respect to said image features, is carried out by an image processing means of a peripheral control means.

19. A method according to claim 18, in which orientation and/or position information is transmitted from the peripheral control means to a host data processor.

20. A method according to claim 1, in which a processing sequence comprises:
    i. mapping a wide-angle image to the plurality of the facets;
    ii. obtaining image features from the plurality of the facets; and
    iii. estimating current orientation and/or position with respect to said image features, is shared at any point in the processing sequence between firstly a peripheral control means and secondly a host data processor.

21. A method according to claim 20, in which information relevant to the next step in the processing sequence is transmitted from the peripheral control means to a host data processor.

22. A method according to claim 1, in which the data processor is a games machine.

23. A non-transitory data carrier comprising computer readable instructions that, when loaded into a computer, cause the computer to carry out the method of claim 1.

24. A games system comprising:
    a camera to capture a wide angle image of an environment, in which the wide-angle image is substantially hemispherical;
    an image processor to obtain image features from the wide angle image, and to interpret those image features as inputs to software running on the games system,
    wherein the image processor is configured to:
    map one or more regions of the wide-angle image to corresponding one or more flat image planes, hereafter referred to as facets;
    obtain said image features from a plurality of the facets of the mapped wide angle image; and
    estimate, from said image features obtained from the plurality of the facets, the positioning of at least part of the body of at least a first user;
    in which the wide angle image is mapped to facets such that each of a plurality of users in the wide angle image is mapped to a separate respective facet.

25. A games system according to claim 24 in which the image processor is further operable to obtain any or all of the following image features from the plurality of the facets of the mapped wide-angle image:
    i. substantially linear edges;
    ii. points where two or more linear edges meet, and;
    iii. predetermined shapes formed by a sets of edges.

26. A games system according to claim 24 in which the image processor is further operable to estimate a current orientation and/or position with respect to said image features.

27. A games system according to claim 24 in which the image processor is further operable to estimate the positioning of at least part of the body of at least a first user based on said image features.

28. A games system according to claim 24, wherein the camera is operably coupled to the image processor by wireless communications means.

29. A games system according to claim 24, in which the camera comprises a charge coupled device operable to generate at wide-angle image comprising at least 1.5 megapixels.

30. A games machine, comprising:
a camera configured to capture a wide angle image of an environment, in which the wide-angle image is substantially hemispherical; and
an image processor configured to:
obtain image features from the wide angle image; and
interpret those image features as inputs to software running on the games machine,
wherein the image processor is configured to obtain the image features from the wide angle image by:
mapping one or more regions of the wide-angle image to corresponding one or more flat image planes, hereafter referred to as facets;
obtaining the image features from a plurality of the facets of the mapped wide angle image; and
estimating, from the image features obtained from the plurality of the facets, the positioning of at least part of the body of at least a first user;
in which the wide angle image is mapped to facets such that each of a plurality of users in the wide angle image is mapped to a separate respective facet.

31. A non-transitory data carrier comprising computer readable instructions that, when loaded into a computer, cause the computer to operate as an image processor to:
map one or more regions of a wide-angle image to corresponding one or more flat image planes, hereafter referred to as facets;
obtain image features from a plurality of the facets of the mapped wide angle image; and
estimate, from the image features obtained from the plurality of the facets, positioning of at least part of the body of at least a first user;
in which the wide angle image is mapped to facets such that each of a plurality of users in the wide angle image is mapped to a separate respective facet.

* * * * *